United States Patent [19]

Birman et al.

[11] Patent Number: 4,901,267
[45] Date of Patent: Feb. 13, 1990

[54] FLOATING POINT CIRCUIT WITH CONFIGURABLE NUMBER OF MULTIPLIER CYCLES AND VARIABLE DIVIDE CYCLE RATIO

[75] Inventors: Mark Birman, Fremont; George K. Chu, Sunnyvale; Fred A. Ware, Los Altos Hills; Selfia Halim, Los Gatos, all of Calif.

[73] Assignee: Weitek Corporation, Sunnyvale, Calif.

[21] Appl. No.: 167,802

[22] Filed: Mar. 14, 1988

[51] Int. Cl.[4] ............................................... G06F 7/38
[52] U.S. Cl. ..................................... 364/736; 364/748
[58] Field of Search ................ 364/736, 748, 754, 761

[56] References Cited

U.S. PATENT DOCUMENTS

| | | | |
|---|---|---|---|
| 4,075,704 | 2/1978 | O'Leary | 364/748 |
| 4,507,728 | 3/1985 | Sakamoto et al. | 364/736 |
| 4,612,628 | 9/1986 | Beauchamp | 364/748 |
| 4,754,421 | 6/1988 | Bosshart | 364/754 |

OTHER PUBLICATIONS

Windsor, II, "IEEE Floating Point Chips Implement DSP Architectures", *Computer Design*, Jan., 1985, pp. 165-170.

*Primary Examiner*—David H. Malzahn
*Attorney, Agent, or Firm*—Townsend and Townsend

[57] ABSTRACT

The present invention optimizes the number and ratio of cycles required among the divide/square root unit, multiplier unit and ALU. An intermediate latch with its own clock is provided at the output of the multiplier half-array in the intermediate stage to feed back data for a second pass for double-precision numbers. The multiplier can then be adjusted for either two-cycle latency mode (for optimizing double-precision multiplies) or three-cycle latency mode (for optimizing single-precision multiplies). A separate divide clock is used for the divide/square root unit, and is synchronized with the multiplier cycle clock on input and output. This allows the divide time to be optimized so that it requires fewer clock cycles when a longer multiplier clock cycle time is used.

7 Claims, 10 Drawing Sheets

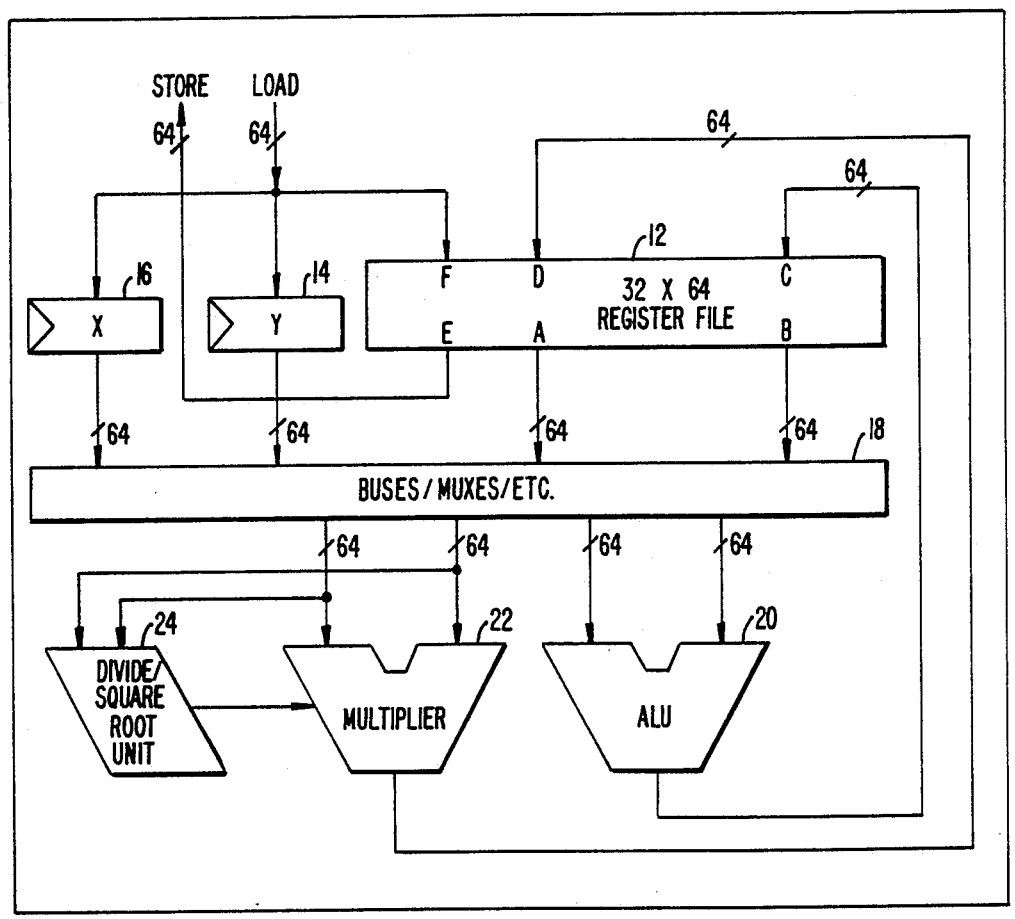
FIG._1.

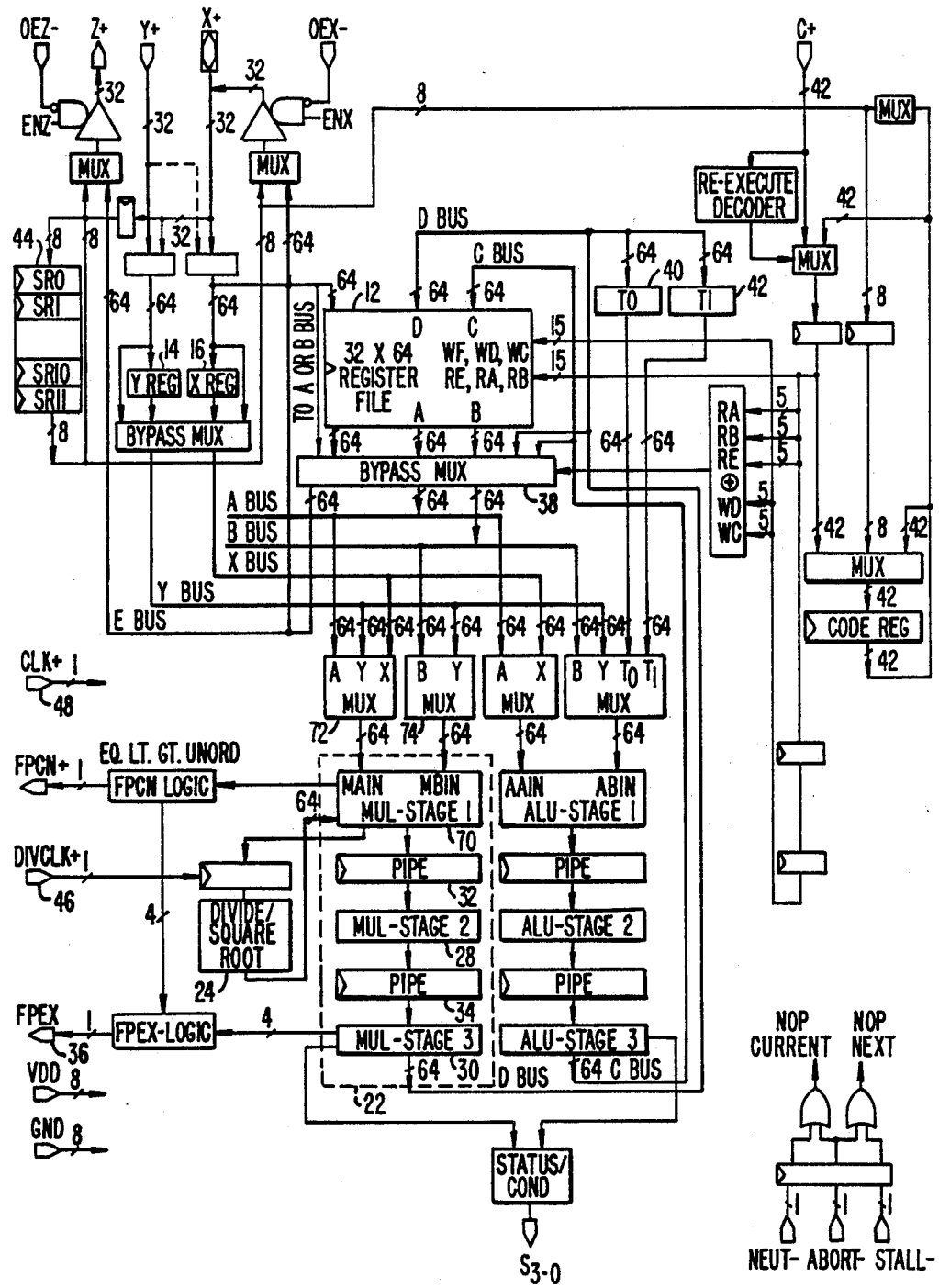
FIG._2.

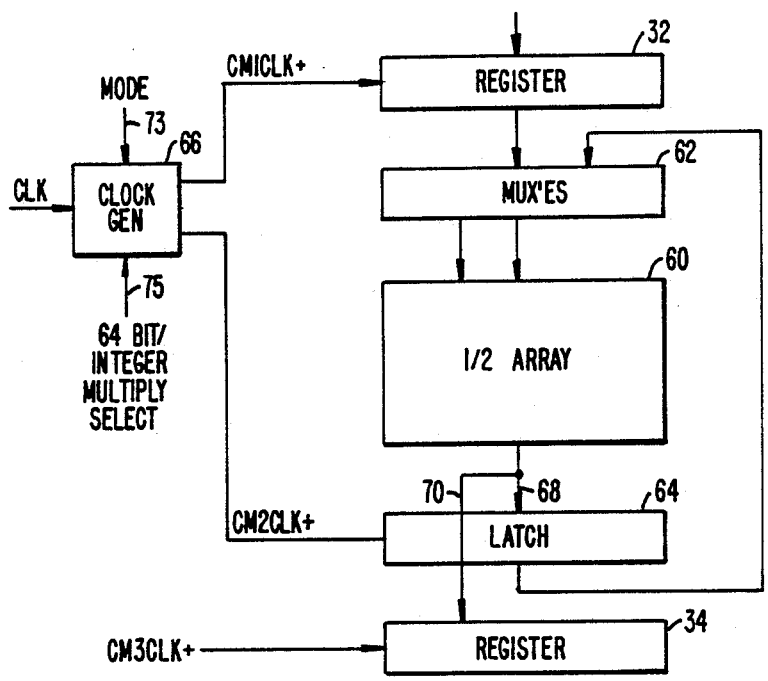
FIG._3.
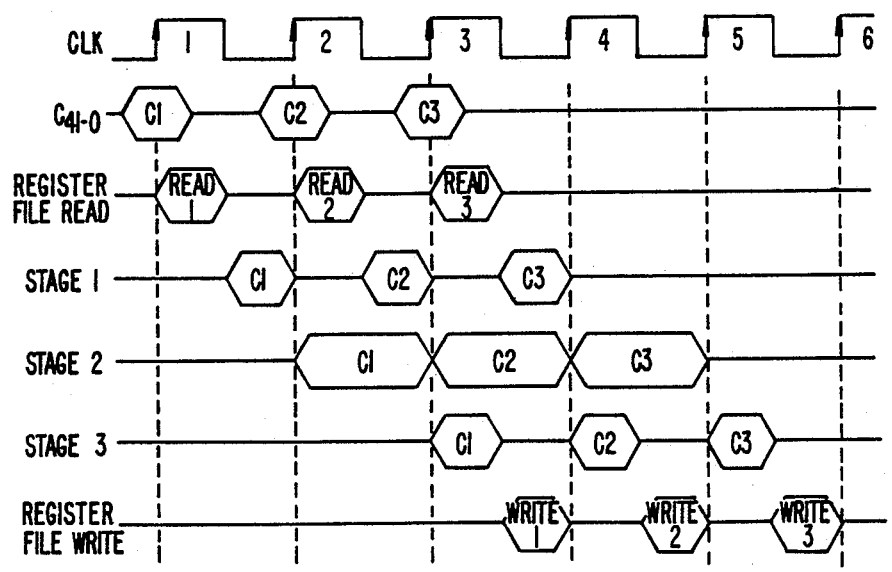
FIG._5.

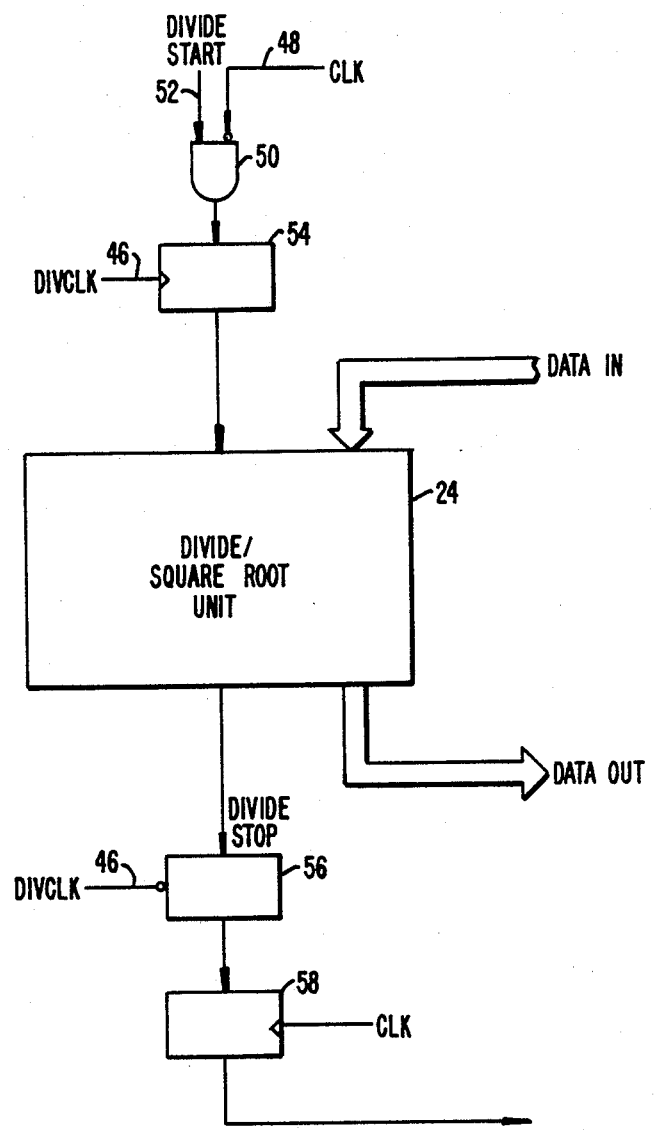
FIG._4.

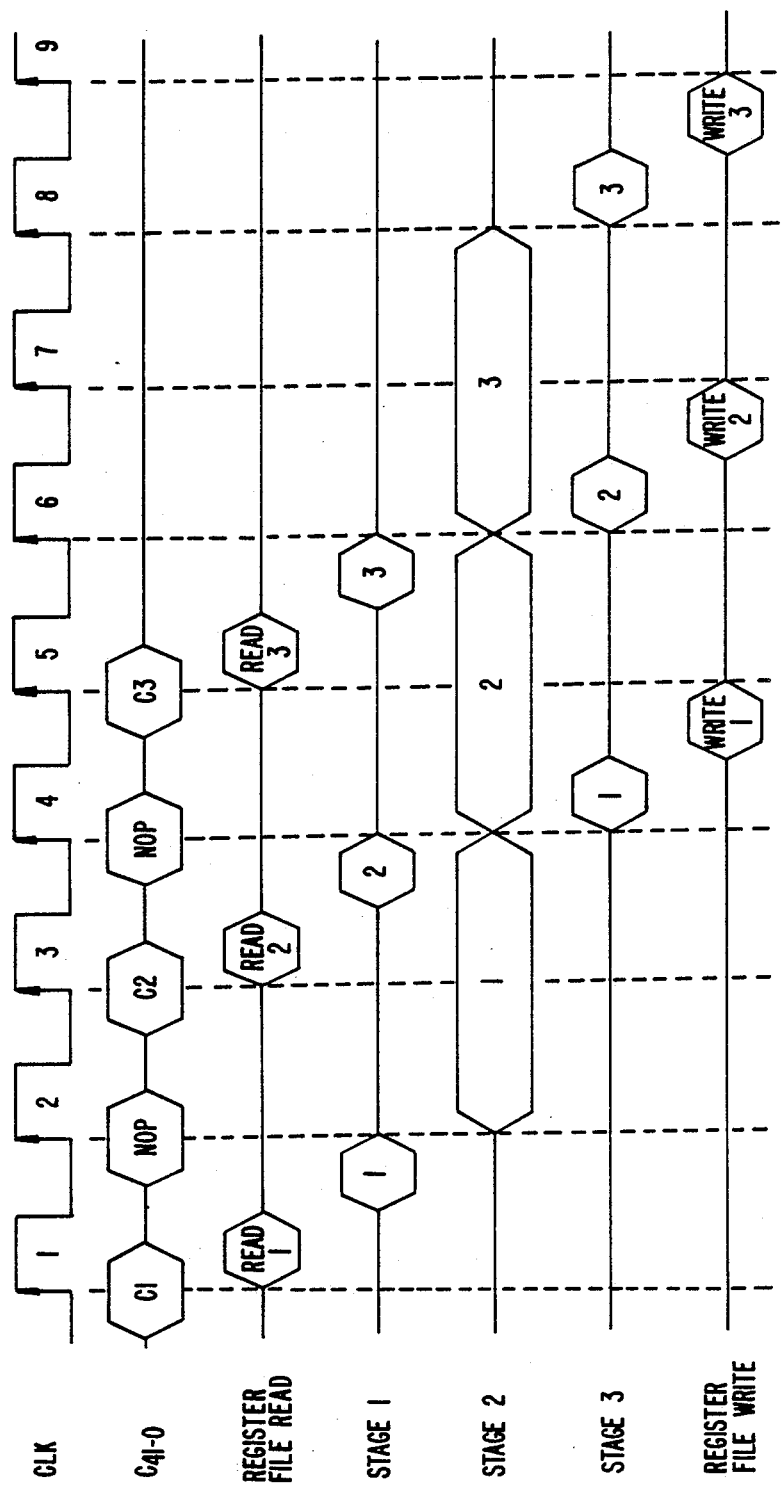
FIG._6.

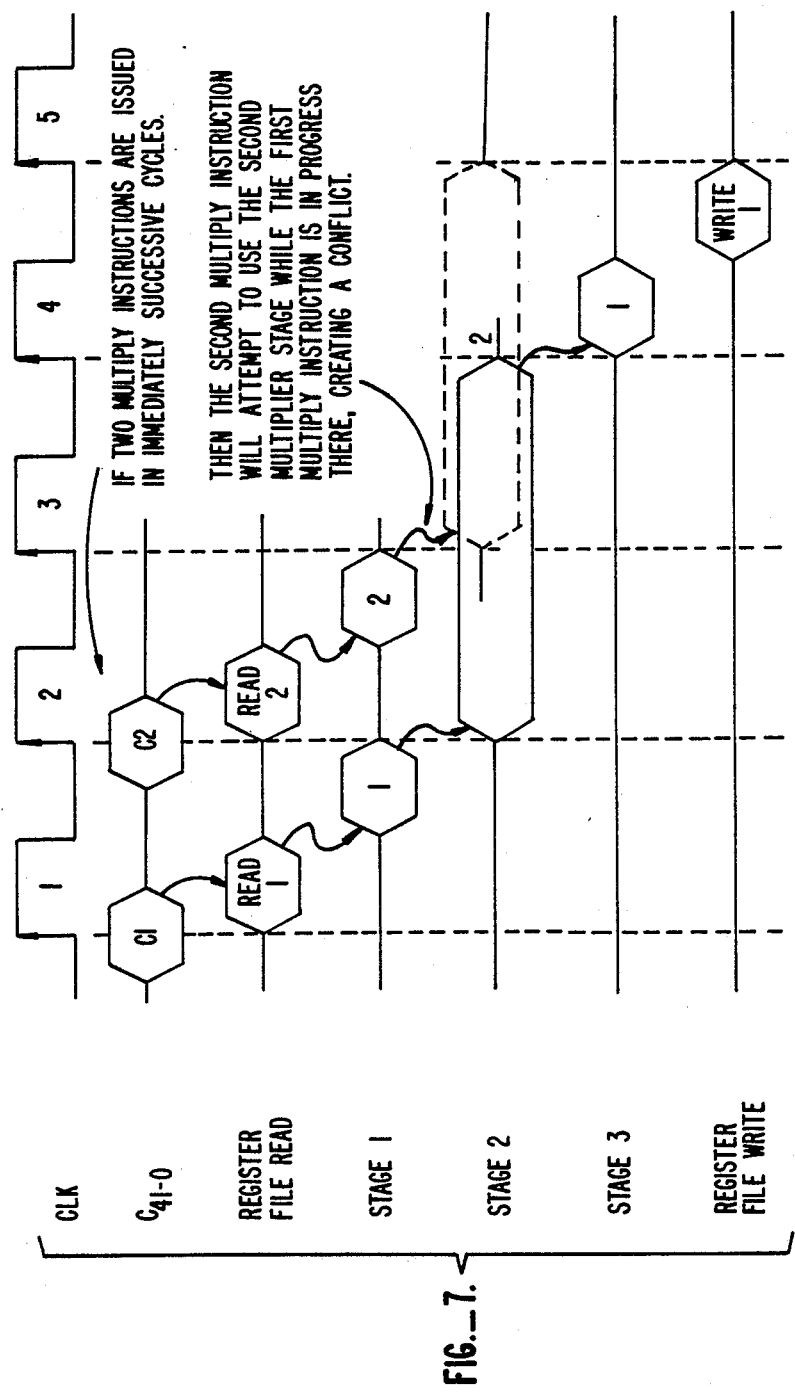
FIG._7.

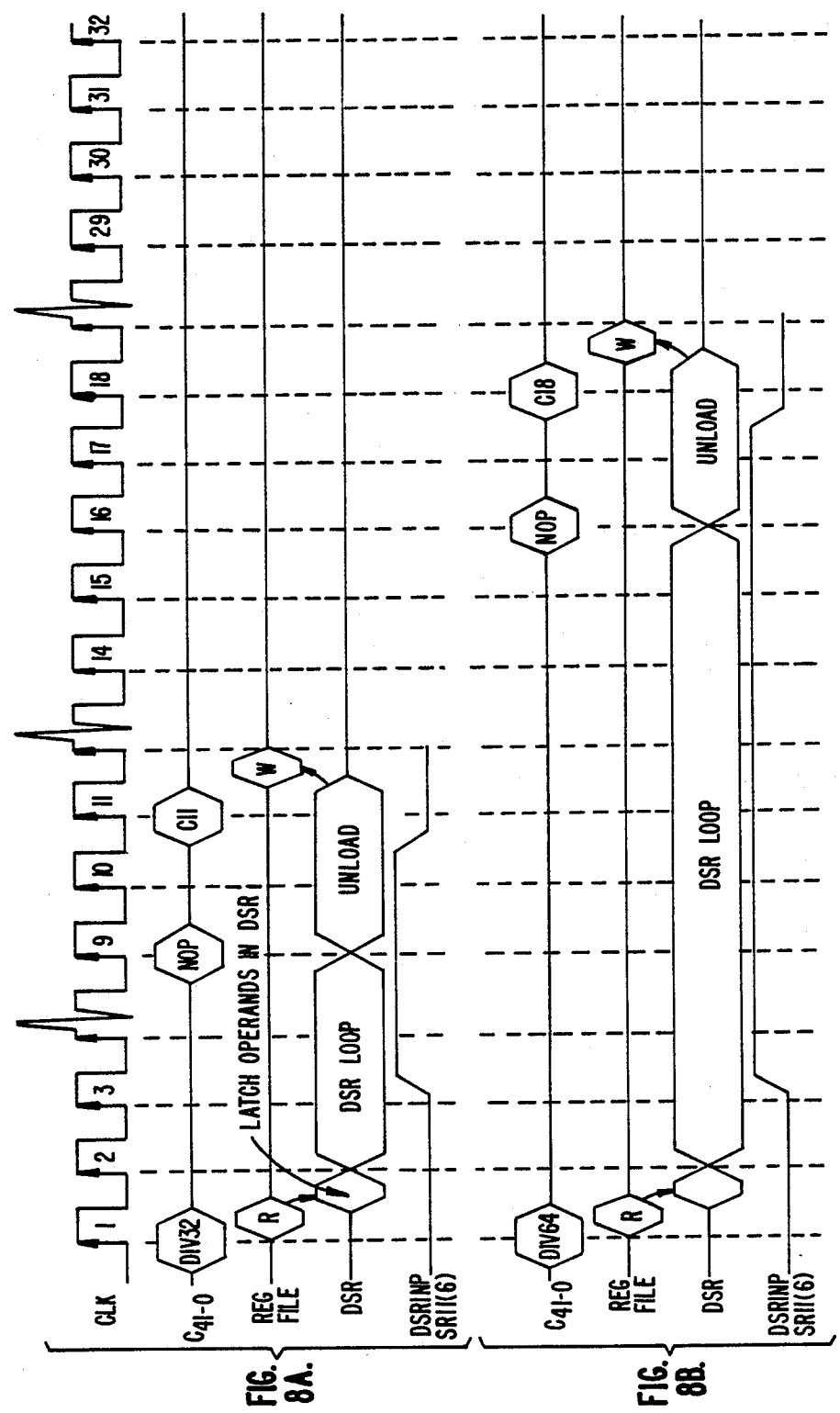

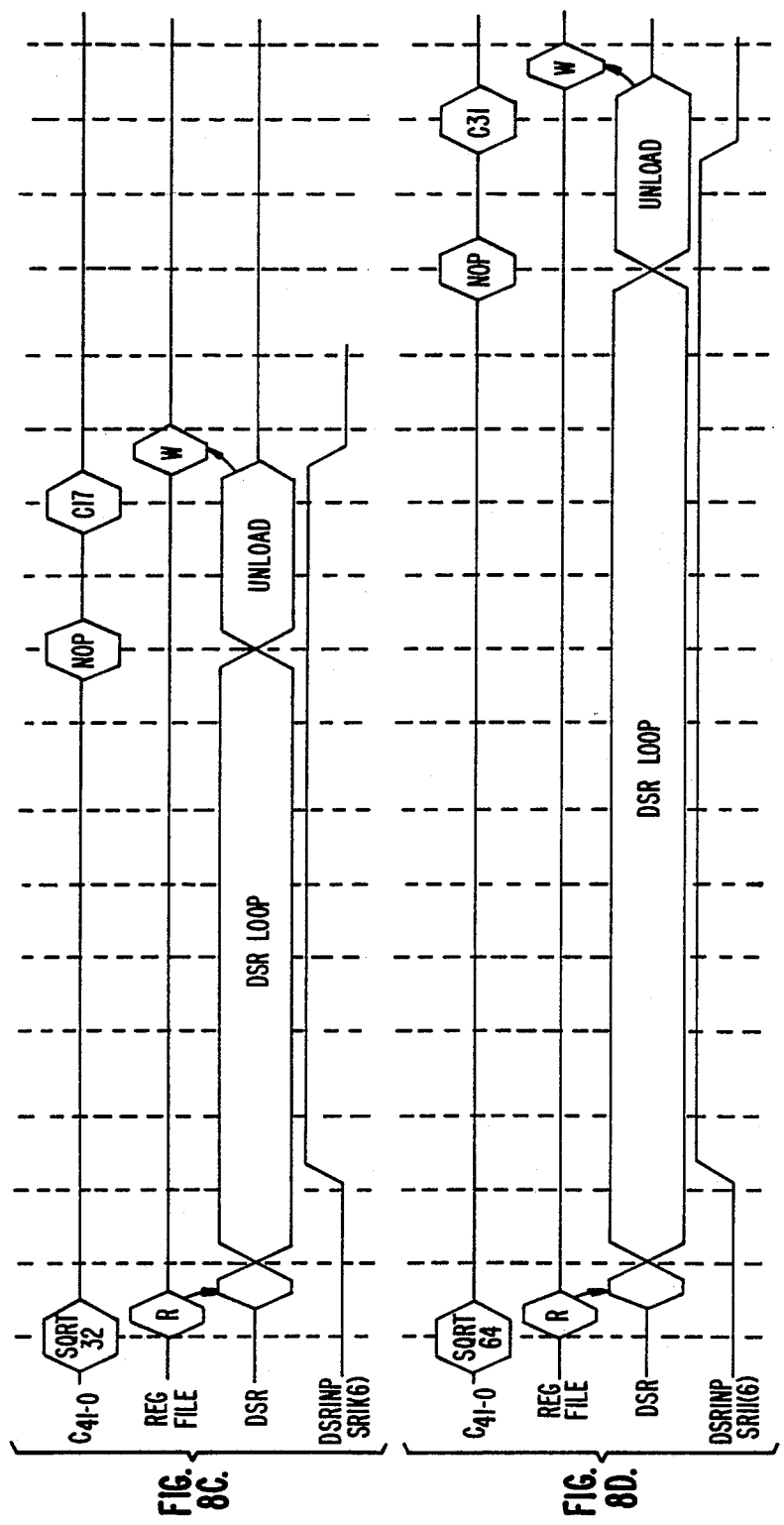

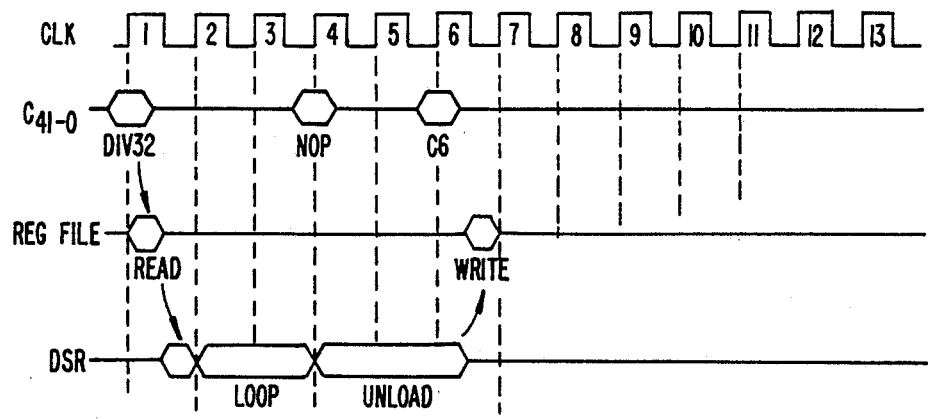
FIG._10A.
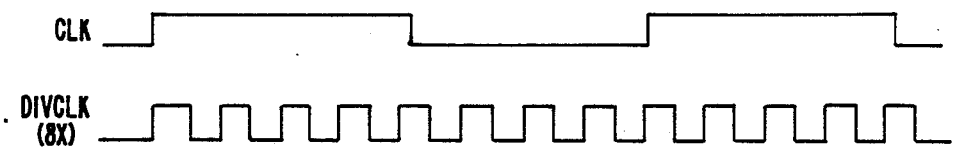
FIG._10B.

FLOATING POINT CIRCUIT WITH CONFIGURABLE NUMBER OF MULTIPLIER CYCLES AND VARIABLE DIVIDE CYCLE RATIO

BACKGROUND

The present invention relates to timing circuits for multiplier and divide/square root units in floating point systems.

A typical floating point system will have both a multiplier (MUL) and an arithmetic logic unit (ALU). Multiplication requires the summation of many partial products, which makes the time to complete a MUL operation longer than the time for an ALU operation. Some systems require the clock cycle time to be as fast as possible which results in multiplication taking more cycles than addition. Other systems require a simple programming model with the same number of cycles for both multiplication and ALU operations. This results in more clock cycles being allocated for an ALU operation than are necessary.

In one architecture, a divide/square root unit shares the same input stage as the multiplier unit and provides its result to succeeding stages of the multiplier unit. Such a divide/square root unit typically requires a fixed number of cycles for an operation, so that control circuitry clocks in the operands and then clocks out the result after counting the required number of cycles.

A multiplier may have three stages in one system, an input stage, an output stage and an intermediate stage with a fixed-point half-array multiplier. A register at the beginning of the output stage has its output fed back to a multiplexer in the intermediate stage to allow a second pass through the half-array for double-precision floating-point and integer multiplications. Single-precision and mixed-precision multiplications require only one pass through the array.

SUMMARY OF THE INVENTION

The present invention optimizes the number and ratio of cycles required among the divide/square root unit, multiplier unit and ALU. An intermediate latch with its own clock is provided at the output of the multiplier half-array in the intermediate stage to feed back data for a second pass for double-precision numbers. The multiplier can then be adjusted for either two-cycle latency mode (for optimizing double-precision multiplies) or three-cycle latency mode (for optimizing single-precision multiplies). A separate divide clock is used for the divide/square root unit, and is synchronized with the multiplier cycle clock on input and output. This allows the divide time to be optimized so that it requires fewer clock cycles when a longer multiplier clock cycle time is used.

The present invention thus allows a user to optimize the circuit for the application expected. The three-cycle latency mode allows a shorter cycle time for single-precision floating-point operations. The invention allows a system designer to get the optimum performance out of the divide square root unit for any particular clock rate for the device. Provided that the device major clock cycle time is long enough, the divide iteration rate is completely independent of the multiplier or ALU configuration. Divide iterations can be formed at a rate that is any positive integer multiple of the ALU/MUL instruction rate.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a floating-point data path which uses the present invention;

FIG. 2 is a more detailed block diagram of the embodiment of FIG. 1 showing the present invention;

FIG. 3 is a block diagram of the multiplier array feedback;

FIG. 4 is a block diagram of the synchronizing circuits for the divide clock;

FIG. 5 is a timing diagram of the two-cycle latency mode for the multiplier;

FIG. 6 is a timing diagram of the three-cycle latency mode for the multiplier;

FIG. 7 is a block diagram showing why two integer or double-precision floating point multiply instructions cannot follow each other in three-cycle latency modes;

FIGS. 8A-D are timing diagrams of the divide/square root unit;

FIGS. 10A and 10B are timing diagrams of the divide/square root unit where the divide clock frequency is 8×main clock frequency.

DETAILED DESCRIPTION OF THE PREFERRED EMBODIMENTS

Figure 9A:
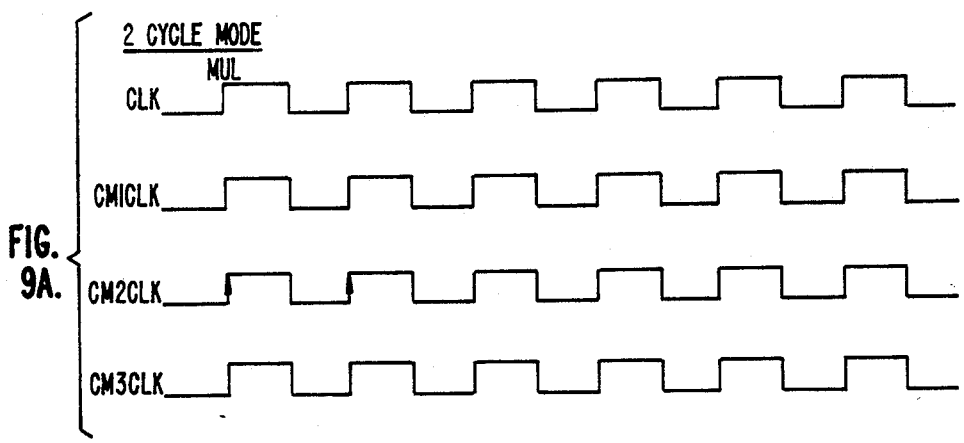
FIGS. 9A-9C are timing diagrams of the clocks of FIG. 3.

FIG. 1 is a block diagram of a 64-bit floating-point data path which utilizes the present invention. A register file 12 and registers 14 and 16 provide input data to busing and multiplexing The divide/square root unit shares input and output circuitry with the multiplier. Typically, operands are clocked into divide/square root unit 24 and a counter is activated to clock out the result a fixed number of cycles later. The present invention. however, uses a separate divide clock as shown in the more detailed block diagram of FIG. 2.

As can be seen from FIG. 2, multiplier 22 is pipelined with three stages, a first stage 26, a second stage 28 and a third stage 30. There are also two pipeline registers 32 and 34. Every multiply operation passes through these stages and registers in succession.

Stage 1 contains front-end circuits to detect source exceptions, e.g. denormalized numbers and invalid operations, and contains an adder to add exponents of floating-point numbers. If a source exception or an invalid operation is detected in stage one, floating-point exception output pin S6, FPEX-. will be asserted, to indicate the exception to the rest of the system.

Stage 2 contains a fixed-point half-array (54×27) multiplier to multiply integers or fractions of floating-point numbers. Single-precision and mixed-precision floating-point multiplications take one pass through the array, while double-precision floating-point and integer multiplications take two passes. Stage 2 operation takes one or two entire cycles following the completion of stage 1 operation.

Stage 3 contains IEEE rounding circuits and result exception circuits. The stage 3 operations always take place in the first half of a cycle following the completion of a stage 2 operation.

The multiplier has two input ports and one output. The selection of input port operands is controlled by single-bit MAIN (multiplier A input) and MBIN (multiplier B input) multiplexer controls, which are two of the inputs to the chip. The sources of multiplier operands are X register 16, Y register 14 and the A and B ports of register file 12. The output of a third stage of the multiplier is placed on the D bus. This output is always routed to the D port of register file 12. This output can also be forwarded to the E port through bypass multiplexer 38 on a store operation. In certain operations, the output can be routed to one or both of temporary latches 40, 42 (T0, T1). These are used in a multiply-add operation. In register-to-register operations, the output can be forwarded directly to an input of the multiplier or the ALU through bypass multiplexer 38, bypassing register file 12.

The multiplier can be adjusted to two latency modes. The latency is the number of clock cycles required to complete a multiply operation. The latency mode is controlled by a multiply latency mode bit in status register 44. The purpose of providing the two modes is to allow the user to optimize either single-precision or double-precision multiplications. It is possible to switch between the two multiplier latency modes by changing the value of the mode bit.

In the two cycle latency mode, stage 2 operation takes one cycle, with each pass through the array occurring in approximately one half of a cycle or less. In the three cycle latency mode, each pass is given an entire cycle and thus the stage 2 operation takes two entire cycles. However, since it is necessary to pass through the array only once per cycle, the cycle itself can be shorter.

FIG. 3 shows the circuitry which enables a change in the latency mode of the multiplier. Pipeline registers 32 and 34 at the input and output of the multiplier array are shown. The half-array itself is indicated as block 60. The input to the half-array is provided by multiplexer 62 and a latch 64 is provided between the output of array 60 and pipeline register 34. A clock generator circuit 66 provides clock signals to pipeline registers 32 and 34 and latch 64. Two data paths are provided from the output of array 60, a first data path 68 to latch 64 and a second data path 70 directly to pipeline register 34. The latency mode control bit on line 73 controls the clock signals. In the three-cycle latency mode, the clock signal to latch 64 is provided on each major clock signal. In the two-cycle latency mode, latch 64 is clocked each half cycle so that two passes through the array are completed in one cycle. A timing diagram showing the relative timing of clocks CM1CLK+, CM2CLK+ and CM3CLK+ are shown in FIG. 9.

FIG. 5 is a timing diagram of the two-cycle latency mode and FIG. 6 is a timing diagram of the three-cycle latency mode. As can be seen in FIG. 7, two integer or double-precision floating point multiply instructions may not follow each other in three-cycle latency mode because this would result in an overlap in stage 2.

Figure 9B:
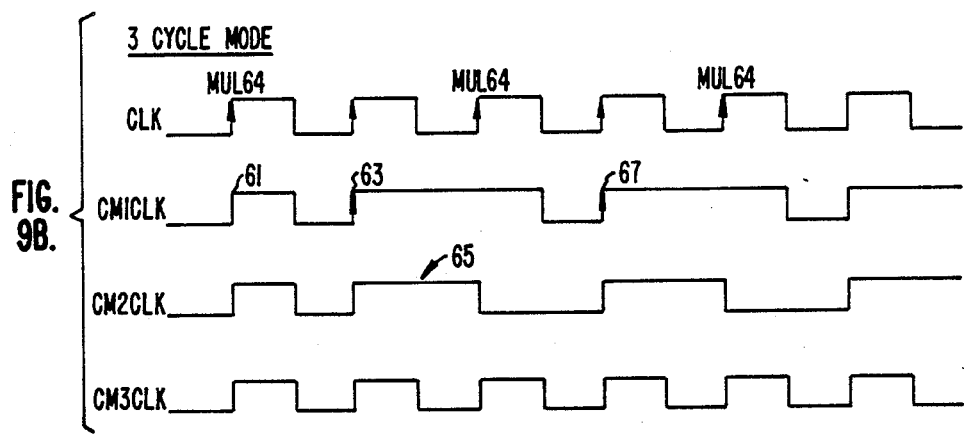
Figure 9C:
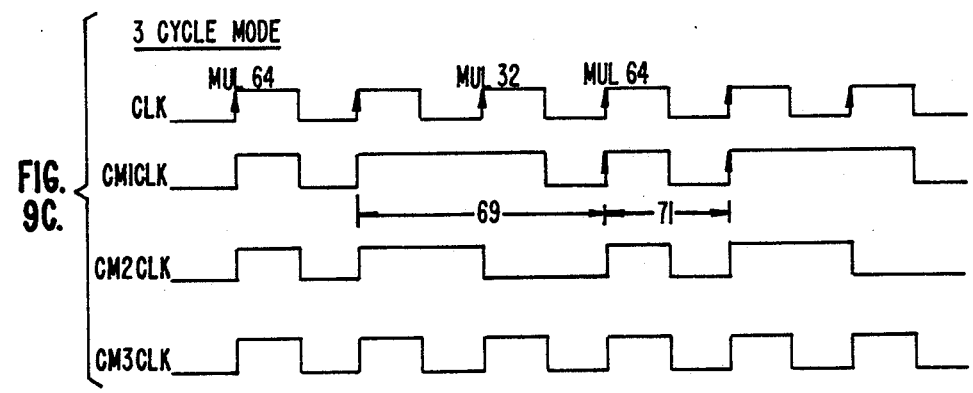

FIGS. 9A, 9B and 9C show the clock timing for the two-cycle mode, the three-cycle mode (double-precision following double-precision) and three-cycle mode (double-precision followed by single-precision). As can be seen from FIG. 9A, the clocks are identical for the two-cycle mode. The CM2CLK signal is provided to a latch which is level triggered, not edged triggered like the registers. Accordingly, changes to the contents of the latch will be locked out after half of a clock cycle, thus allowing two passes through the array in a single cycle of the clock.

Referring to FIG. 9B, an instruction starts (stage 1) at a time 61 and register 32 receives data on the rising edge of CM1CLK at a time 63. While the CM2CLK signal is high at a time 65, the first pass is made through the array, and then CM2CLK goes low, preventing further changes to the data in the latch, for the second pass through the half array. There is no rising edge of CM1CLK during this period, with the next rising edge occurring at a time 67 when the half array will again be available for data. For half of the time, the output of register 34 will be garbage, but this does not matter since it is not sent to the register file.

FIG. 9C shows a double-precision multiply followed by a single-precision multiply in which the CM1CLK signal and the CM2CLK signal change from the mode of FIG. 9B during a period 69 to the mode of FIG. 9A during a period 71.

Clock generation circuit 66 of FIG. 3 produces the waveforms of FIGS. 9A–9C, and can be implemented in any of a number of ways. The inputs are the latency mode bit 73 the CLK signal and a 64 bit integer multiply select signal 75 which tells the circuit whether there is a double-precision multiply or a single-precision multiply.

Returning to FIG. 2, Divide/square root unit 24 is provided with a separate divide clock (DIVCLK+) 46. The rest of the circuitry receives a clock signal 48 (CLK+). The synchronization of these two signals on the input and output of divide/square root unit 24 is shown in more detail in FIG. 4.

As can be seen from FIG. 4, clock signal 48 is provided to an AND-gate 50 along with a divide start signal 52. The result is provided to a register 54 which is clocked by divide clock signal 46. The circuit assumes that the DIVIDE START signal becomes settled while the clock is high (during the first half of a major clock cycle). The output of register 54 provides a control signal to divide/square root unit 24 to start a DIV/SQRT operation upon the input of new data. The output of data is controlled by a divide stop signal to a latch 56 which is clocked by divide clock 46. The output of latch 56 is provided to a register 58 which is clocked by clock signal 48. The actual implementation of this circuitry contains other logic elements which are unrelated to the present invention and are accordingly not shown. However, the diagram of FIG. 4 shows the logical synchronization function.

The same multiplexers 72, 74 that select multiplier operands also select the operands for the divide/square root (DSR) unit. The DSR also shares the multiplier's source exceptions circuits.

The DSR's separate clock input, DIVCLK, may operate at either the same (1X), or double (2X), or any integer times the frequency, of the main clock CLK.

Divide operations are performed at the rate of two bits of the result fraction per DIVCLK cycle. Square root operations (SQRT) operate at the rate of one bit of the result fraction per DIVCLK cycle.

Consider a sequence of events in a DSR operation, for the case of 2×DIVCLK. See FIGS. 8A–8D. The timing for 32 and 64 bit divides and 32 and 64 bit square root operations are shown in FIGS. 8A–8D, respectively. A DSR operation (divide or SQRT) is clocked in on the rising edge of cycle 1. In the first half of this cycle operand(s) are read from the register file, and in the second half of the cycle they are latched in the DSR unit. The actual DSR loop starts on the rising edge of cycle 2. After the loop is completed in the DSR unit, its result is loaded into the multiplier stage 1, provided the multiplier is unoccupied. To assure that the multiplier is unoccupied when the loop is finished and to unload the DSR result through the multiplier without delay, a NOP (no operation) can be inserted in cycle 9. If the unload operation starts in the first half of cycle N, the result is written in the register filed in the second half of cycle N+2, so the entire unload operation takes three cycles. Once unload starts, it essentially "looks" like any other two-cycle latency multiplier operation. If the multiplier is occupied by another operation when the loop is complete and unload could be initiated, the DSR unit waits until the multiplier becomes available. The DSR result will be unloaded into the multiplier in the first "empty" timing slot in the multiplier after the Divide/Square Root Unit has finished its operation. The result of the DSR operation is stored in a register file location whose address is given by the instruction which started the operation.

Once a DSR operation has started, the multiplier may be utilized for other operations. Therefore, multiplier operation may be initiated on any cycle after the DSR instruction has been clocked in, other than the one containing NOP. Of course, the cycle containing the NOP may be used for an ALU-only operation.

When a DSR operation is initiated on cycle 1, a special bit, called DSRINP (DSR operation In Progress) in the status register, $SR_6$, is set in cycle 3; it is automatically cleared in the cycle preceding the one in which the DSR result is written into the register file. Using DIV32 (FIG. 8A) as an example, a store status instruction clocked in on the rising edge of cycle 3 will "see" DSRINP=1, and a store status instruction clocked in on cycle 11 would indicate that DSRINP=0, i.e. there is no DSR operation in progress.

Register-to-register latency for the operations described (2×DIVCLK) is:

| | |
|---|---|
| Single-precision divide | 10 cycles of CLK |
| Double-precision divide | 17 cycles of CLK |
| Single-precision SQRT | 16 cycles of CLK |
| Double-precision SQRT | 30 cycles of CLK |

The latency count is from the DSR instruction to the first instruction that could use the result of the DSR operation as an operand. For example, in the case of DIV32 instruction, the result is written into the register file in the second half of cycle 11. However, an instruction that uses this result may be clocked in on the rising edge of cycle 11, using register file bypass. This instruction is denoted in FIG. 8A as C11; it could be any instruction, including another DSR operation. Therefore, in this case the latency is from rising edge of cycle 1 to that of cycle 11, which is 10 cycles. This reasoning applies equally to the other cases.

If two DSR operations must follow one another back-to-back, the second operation may be clocked in on the code port only after the first operation propagated to stage 3 of the multiplier and generated any potential result exceptions. For example, if two single-precision divides must be executed consecutively, and the first one was initiated on cycle 1, then the second one may be initiated on cycle 11. Refer to FIG. 8A.

The formula for the number of CLK cycles it takes to complete a divide is as follows:
Single-precision divide: [14/N]+3
Double-precision divide: [28/N]+3
Single-precision Sq root: [25/N]+3
Double-precision Sq root: [54/N]+3 where N is 1,2,3 ... and the
CLK period=N×(DIVCLK period)

As can be seen, since the divide operation is asynchronous with respect to the multiplier, the divide clock can be any integral multiple of the system clock so long as the minimum divide clock time is maintained. Accordingly, where a longer system clock cycle is required, a smaller number of system clock cycles will be required to perform a divide operation.

An example of the Divide/Square Root timing when the Divide Clock frequency is 8 times the main clock frequency (FIG. 10B) is shown in FIG. 10A. For 64 bit divide and 32 bit square root operations, the loop is 4 cycles and for 64 bit square root operations the loop is 7 cycles. Otherwise the timing is as set forth in FIG. 10A. The latency where the divide clock is 8 times the main clock frequency is:
32 bit divide=5 cycles of CLK;
64 bit divide=7 cycles of CLK;
32 bit square root=7 cycles of CLK;
64 bit square root=10 cycles of CLK.

As will be understood by those familiar with the art, the present invention may be embodied in other specific forms without departing from the spirit or essential characteristics thereof. For example, different synchronization circuitry could be used for synchronizing the divide clock with the system clock. Accordingly, the disclosure of the preferred embodiment o±the invention is intended to be illustrative, but not limiting, of the scope of the invention which is set forth in the following claims.

What is claimed is:

1. In a circuit having a multiplier, an arithmetic logic unit and means for providing a primary cycle clock, said multiplier having a first stage including an input register, a second stage including a multiplexer coupled to said input register and a multiplier array coupled to said multiplexer, and a third stage including an output register or latch coupled to said multiplier array, the improvement comprising:
   a latch having an input coupled to an output of said multiplier array;
   a first data bus coupling an output of said latch to an input of said multiplexer;
   a second data bus coupling said multiplier array directly to said output register; and
   means for selectively providing said primary cycle clock or a fraction of said primary cycle clock to a clock input of said latch.

2. In a circuit having a multiplier unit and a divide and square root unit, both said units being coupled to receive operands from a multiplier circuit for selecting operands, said multiplier receiving a system clock signal from a clock circuit, the improvement comprising:
   means, coupled to said clock circuit, for providing a divide clock signal to said divide and square root unit, said divide clock signal having a frequency which is an integral multiple, other than one, of a frequency of said system clock signal;
   means, coupled to an input of said divide and square root unit, for synchronizing a data input of said divide and square root unit to said system clock signal and said divide clock signal; and
   means, coupled to an output of said divide and square root unit, for synchronizing a data output of said divide and square root unit to said system clock signal and said divide clock signal.

3. The circuit of claim 2 further comprising:

means for generating a divide start signal for initiating a divide or square root operation;
said means for synchronizing a data input comprising an AND-gate coupled to receive said system clock signal and said divide start signal and a register or latch coupled to receive an output of said AND-gate and having a clock input coupled to receive said divide clock signal.

4. The circuit of claim 2 wherein said divide and square root unit includes means for generating a divide stop signal to indicate the end of a divide or square root operation, said means for synchronizing a data output comprising a first register or latch receiving said divide stop signal as an input and having a clock input coupled to receive said divide clock signal and a second register or latch having an input coupled to receive an output of said first register or latch and having a clock input coupled to receive said system clock signal.

5. In a circuit having a multiplier, an arithmetic logic unit, a divide and square root unit and means for providing a primary cycle clock, said multiplier having a first stage including an input register, a second stage including a multiplexer coupled to said input register and a multiplexer array coupled to said multiplexer, and a third stage including man output register or latch coupled to said multiplier array, the improvement comprising:
a latch having an input coupled to an output of said multiplier array;
a first data bus coupling an output of said latch to an input of said multiplexer;
a second data bus coupling said multiplier array directly to said output register;
means, coupled to said means for providing a primary cycle clock, for selectively providing said primary cycle clock or a fraction of said primary cycle clock to a clock input of said latch;
means for providing a divide clock to said divide and square root unit, said divide clock having a frequency which is an integral multiple of a frequency of said primary cycle clock;
means for synchronizing a data input of said divide and square root unit to said primary cycle clock and said divide clock; and
means for synchronizing a data output of said divide and square root unit to said primary cycle clock and said divide clock.

6. A method for adjusting the latency mode of a multiplier circuit having a first stage including an input register, a second stage including a multiplexer coupled to said input register and a multiplier array coupled to said multiplexer, and a third stage including an output register or latch coupled to said multiplier array, comprising the steps of:
providing a latch having an input coupled to an output of said multiplier array;
providing a first data bus coupling an output of said latch to an input of said multiplexer;
providing a second data bus coupling said multiplier array directly to said output register; and
providing one of a primary clock signal or a fraction of said primary clock signal to a clock input of said latch.

7. A method for providing a selectable frequency divide clock in a circuit having a multiplier unit and a divide and square root unit, both said units being coupled to a multiplexer circuit for selecting operands, said multiplier receiving a system clock from a clock circuit, comprising the steps of:
providing a divide clock to said divide and square root unit, said divide clock having a frequency which is an integral multiple, other than one, of a frequency of said system clock;
synchronizing a data input of said divide and square root unit to said system clock and said divide clock; and
synchronizing a data output of said divide and square root unit to said system clock and said divide clock.

* * * * *